United States Patent [19]
Oda

[11] Patent Number: 4,879,101
[45] Date of Patent: Nov. 7, 1989

[54] METHOD FOR PRODUCING A MAGNESIA POWDER FOR USE AS AN ELECTRICAL INSULATING MATERIAL

[75] Inventor: Yasuyoshi Oda, Tokyo, Japan
[73] Assignee: Shin Nihon Chemical Industry Co., Ltd., Osaka, Japan
[21] Appl. No.: 165,346
[22] Filed: Feb. 29, 1988

Related U.S. Application Data

[63] Continuation of Ser. No. 874,686, Jun. 16, 1986, abandoned.

[30] Foreign Application Priority Data

Jun. 17, 1985 [JP] Japan ................................. 60-129954
Mar. 17, 1986 [JP] Japan ................................. 61-56900

[51] Int. Cl.$^4$ ............................ C01F 5/26; C04B 35/04
[52] U.S. Cl. ...................................... 423/163; 423/155; 423/636; 423/639; 501/108
[58] Field of Search ............... 423/178, 155, 635, 163, 423/636, 639; 501/108, 35

[56] References Cited

U.S. PATENT DOCUMENTS

| | | | |
|---|---|---|---|
| 2,798,002 | 7/1957 | Porter | 501/108 |
| 3,337,353 | 8/1967 | Alper et al. | 501/108 |
| 3,677,779 | 7/1972 | Hughey | 501/108 |
| 4,060,424 | 11/1977 | Hofmann | 501/108 |
| 4,287,006 | 9/1981 | Hiromae et al. | 501/108 |
| 4,585,743 | 4/1986 | Yamamoto et al. | 501/108 |

FOREIGN PATENT DOCUMENTS

| | | | |
|---|---|---|---|
| 1200186 | 9/1965 | Fed. Rep. of Germany | 501/108 |
| 1571601 | 4/1971 | Fed. Rep. of Germany | 501/108 |
| 38-1898 | 3/1963 | Japan | 501/108 |
| 51-25508 | 3/1976 | Japan | 501/108 |
| 54-70312 | 6/1979 | Japan | 501/108 |
| 60-42271 | 3/1985 | Japan . | |
| 60-42272 | 3/1985 | Japan . | |
| 60-129954 | 6/1985 | Japan . | |
| 353929 | 10/1972 | U.S.S.R. | 501/108 |
| 1361187 | 7/1974 | United Kingdom | 501/108 |

OTHER PUBLICATIONS

Japanese Patent Application Publication No. 60-45145 corresponding to Japanese Patent Application Laid-Open Specification No. 55-67561 laid-open on May 21, 1980 (Fukuda et al.).
Japanese Patent Application Laid-Open Specification No. 60-42272 laid-open on Mar. 6, 1985 (Anekawa et al.).
Japanese Patent Application Laid-Open Specification No. 60-42271 laid-open on Mar. 6, 1985 (Samejima et al.).
"Japan Chemical Week", dated Jan. 14, 1986 published by the Chemical Daily Co., Ltd., Japan.
"Shinzairyo (New Material) 1985", pp. 467-468 (1985) published in Sep. 1985 by Toray Research Center, Japan.
Brochure issued Oct., 1985 by Asahi Chemical Industry Co., Ltd., Japan.
Chemical Abstracts, vol. 102, No. 6, Feb. 11, 1985, p. 593, No. 54 811h (partial translation in English of Japanese Patent Application Laid-Open Specification No. 59-175585/1984).
Chemical Abstracts, vol. 102, No. 12, Mar. 25, 1985, p. 580, No. 104 639f (partial translation in English of Japanese Patent Application Laid-Open Specification No. 59-215690/1984).

*Primary Examiner*—William R. Dixon, Jr.
*Assistant Examiner*—Deborah Jones
*Attorney, Agent, or Firm*—Finnegan, Henderson, Farabow, Garrett & Dunner

[57] ABSTRACT

A method for producing a magnesia powder for use as an electrical insulating material. A magnesia clinker powder is washed with an aqueous solution of an acid. The acid radical content of the powder is subsequently reduced to 0.015% by weight or less by washing the powder with water or by subjecting the powder to a heat treatment.

5 Claims, No Drawings

METHOD FOR PRODUCING A MAGNESIA POWDER FOR USE AS AN ELECTRICAL INSULATING MATERIAL

This application is a continuation of application Ser. No. 874,686, filed June 16, 1986 abandoned.

This invention relates to a magnesia powder for use as an electrical insulating material. More particularly, the present invention is concerned with a magnesia powder adapted for use as an electrical insulating material and improved with respect to flowability, which comprises a sintered magnesia composed mainly of MgO.

It is known that MgO is excellent in high frequency shielding effect as well as in insulation resistance at high temperatures. For example, an electrofused magnesia composed mainly of MgO exhibits a high insulation resistance at high temperatures and has conventionally been employed as an electrical insulating material, e.g. as a filling material for electrical insulation of a sheathed heater comprising a metal pipe and an electric heater disposed within and extending throughout the length of the pipe.

However, an electrofused magnesia is obtained in the form of a large mass due to the nature of the method of production thereof. Therefore, an electrofused magnesia has to be pulverized into a fine powder before being used as an electrical insulation filling material for a sheathed heater and the particles of the powder obtained by pulverization are angular in shape. Because of the above-mentioned angular shape of the particles of the powder, the flowability of the electrofused magnesia powder is unsatisfactorily low. The flowability of the magnesia powder is very important, particularly when the magnesia powder is used as the insulation filling material for a sheathed heater, that is, the powder is filled between the metal pipe and the heater for electrical insulation. The flowability of the magnesia powder greatly affects the workability of filling a powder and the maintenance of initial insulation resistance. Further, when the powder has an angular shape, it cannot be densely filled between the metal pipe and the heater, leading to a poor insulation resistance. As is apparent from the foregoing, because of its poor flowability, electrofused magnesia is not satisfactory for use as an electrical insulating material.

Japanese Patent Application Publication No. 60-45145 discloses a high purity sintered magnesia. However, the sintered magnesia disclosed in Japanese Patent Application Publication No. 60-45145 has the drawbacks that the insulation resistance thereof at high temperature is poor due to the presence of a large amount of CaO, SiO$_2$ and B$_2$O$_3$ on the surface of the sintered magnesia and that the performance of the magnesia with respect to insulation resistance is lowered with the repeated use.

On the other hand, Japanese Patent Application Laid-Open Specification No. 60-42272 discloses a magnesia aggregate. The magnesia aggregate is prepared by subjecting a sintered magnesia to a treatment with an acidic solution. Such magnesia aggregate is excellent in flowability but is not still satisfactory from a commercial point of view because the insulation resistance at high temperatures is not still sufficiently high and the performance with respect to insulation resistance becomes poor with the repeated use.

The present inventor has made intensive and extensive studies with a view to developing a new type of sintered magnesia powder for use as an electrical insulating material free from the above-mentioned drawbacks accompanying the conventional magnesia powders such as an electrofused magnesia, the sintered magnesia disclosed in Japanese Patent Application Publication No. 60-45145 and magnesia aggregate disclosed in Japanese Patent Application Laid-Open Specification No. 60-42272. As a result, the present inventor has found a sintered magnesia powder exhibiting a high insulation resistance at high temperatures and a high flow rate.

Accordingly, it is an object of the present invention to provide a sintered magnesia powder which has a high insulation resistance at high temperatures and exhibits an excellent flowability.

According to the present invention, there is provided a magnesia powder improved with respect to flowability and adapted for use as an electrical insulating material which comprises a sintered magnesia composed of at least 90% by weight of MgO and not more than 0.02% by weight of B$_2$O$_3$ and has an insulation resistance of at least $10^7$ Ω·cm at 1000° C. and at least $10^9$ Ω·cm at 600° C.

The magnesia powder of the present invention comprises a specific sintered magnesia. The sintered magnesia of the present invention is composed of at least 90% by weight, preferably at least 95% by weight of MgO and not more than 0.02% by weight of B$_2$O$_3$, optionally with SiO$_2$, Fe$_2$O$_3$, Al$_2$O$_3$, CaO and ZrO$_2$, provided that the amount of MgO in the sintered magnesia is 90% by weight or more. The sintered magnesia may consist of MgO only. However, it is preferred from the standpoint of ease of production that the upper limit of the MgO content of the sintered magnesia be 99.7% by weight, more preferably 99% by weight. In this connection, it is noted that the sintered magnesia may contain B$_2$O$_3$, SiO$_2$, Fe$_2$O$_3$, Al$_2$O$_3$, CaO etc. originated from a raw magnesia and CaO, SiO$_2$, Fe$_2$O$_3$, ZrO$_2$, etc. which are often used as an additive in sintering a raw magnesia so long as the content of MgO in the sintered magnesia is at least 90% by weight and the content of B$_2$O$_3$ in the magnesia is not more than 0.02% by weight. Where the MgO content of the sintered magnesia is less than 90% by weight, the insulation resistance of the magnesia powder and lifetime of a sheathed heater filled with the magnesia powder are disadvantageously lowered. For keeping the desired insulation resistance of a sheathed heater filled with the magnesia powder, i.e. at least $10^7$ 106 ·cm at 1000° C. and at least $10^9$ Ω·cm at 600 C., it is required that the B$_2$O$_3$ content of the magnesia powder be not more than 0.02% by weight, and in the present invention it is particularly preferred that the sintered magnesia contain no B$_2$O$_3$.

The magnesia powder of the present invention can be advantageously employed as an electrical insulating material, particularly for a sheathed heater with great advantages. A sheathed heater comprises a metal pipe, an electric heater disposed within and extending throughout the length of the pipe and an electrical insulating material filled in the space between the pipe and the heater. In this connection, both ends of the pipe are sealed with a heat-resistant resin or a glass to obtain a sealed structure. The electrical insulating material used in the sheathed heater is required not only to exhibit a high insulation resistance but also to maintain the high insulation resistance for a long period of time. The magnesia powder of the present invention not only exhibits an excellent insulation resistance at high temperatures but also has an excellent flowability, and, further, can maintain the excellent insulation resistance for a long period of time. Therefore, the magnesia powder of the present invention is particularly suited to be employed as an electrical insulating material for a sheathed heater.

In the present invention, it is preferred from the standpoint of flowability of the magnesia powder that the magnesia powder comprise spherical particles which are mainly of single crystals, and further preferred that the single crystal particles are present in an amount of at least 60% by number based on the total number of the particles of the magnesia powder. The shape of the magnesia powder particles can be observed, for example, by the following method. The magnesia powder is mixed with a liquid resin such as epoxy resin, and from the mixture there is prepared a sample plate in which the magnesia powder is embedded in the resin. The surface of the sample plate is abraded, for example, using a diamond paste until the sections of the powder particles are exposed on the surface of the sample plate. Then, the contours of the sections of the magnesia powder particles exposed on the surface of the sample plate are observed by means of a reflecting microscope. When the magnesia powder particles are of a spherical shape, the contours of the particles are observed to be circular or substantially circular. In this connection, it is noted that even though the contour of the section of the particle observed by means of a reflecting microscope is not an ideal circle and has convex and/or concave portions due to the roughness of the surface of the particle, if the convex and/or concave portions are not angular, the particle is regarded as having a spherical shape.

As mentioned above, in the present invention, it is preferred that the magnesia powder comprise particles which are mainly of single crystals, and further preferred that the single crystal particles be present in an amount of at least 60% by number based on the total number of the particles of the magnesia powder.

The number of single crystal particles present in the magnesia powder can be determined using a reflecting microscope in the same manner as mentioned above with respect to the observation of the contour of the magnesia powder particle. In this regard, it is noted that in determining the number of single crystal particles, at least 100 particles are observed within the field of view of the microscope and the number of single crystal particles is counted, and that even if there is a particle having a polycrystalline thin layer on the surface thereof, if the particle is composed mainly of one crystal, the particle is regarded as being of a single crystal.

In the present invention, it is preferred from the standpoint of flowability of the magnesia powder that the magnesia powder of the present invention have a particle diameter distribution such that the proportion of the particles having a diameter of 0.044 mm or less is 10% by weight or more based on the total weight of the magnesia powder and that the maximum particle diameter is 0.8 mm or less, preferably 0.42 or less, more preferably 0.25 or less.

The magnesia powder of the present invention may be used alone as an electrical insulating material. Further, the magnesia powder of the present invention may also be used in combination with a pulverized electrofused magnesia which has been conventionally used as an electrical insulating material for a sheathed heater. When the magnesia powder of the present invention is used in combination with the pulverized electrofused magnesia, it is preferred that 95 parts by weight or less of the pulverized electrofused magnesia be mixed with 5 parts by weight or more of the magnesia powder of the present invention. By mixing the pulverized electrofused magnesia with the magnesia powder of the present invention, the flowability of the electrofused magnesia can be greatly improved.

The magnesia powder of the present invention may be produced as follows.

A magnesia clinker powder is washed with an aqueous solution of an acid to obtain an acid-washed sintered magnesia powder. The magnesia clinker powder used as the raw material is preferably a high purity magnesia clinker powder. The high purity magnesia clinker powder can be produced by a customary method, e.g. by calcining, e.g., magnesium hydroxide prepared using sea water as the raw material and then sintering the resulting magnesia at 1600° to 1800° C. or more, or by directly sintering, e.g. magnesium hydroxide prepared from sea water at 1600° to 1800° C. or more. The aqueous solution of an acid used for washing the magnesia clinker powder is preferably an aqueous solution of an acid such as HCl, $H_2SO_4$ or $HNO_3$ which solution has a pH value of 3 or less. The washing of the magnesia clinker powder with the aqueous solution of an acid may be performed by any customary technique, for example, by stirring the magnesia clinker powder in the aqueous solution of an acid for at least one min. The amount of the aqueous solution of an acid used is not critical, and is generally used in an amount of at least one liter per 1000 g of the magnesia clinker powder.

The acid-washed sintered magnesia powder is then washed with water so that the acid radical content of the sintered magnesia powder is reduced to 0.015% by weight or less, preferably 0.007% by weight or less, most preferably zero percent. The washing of the washed sintered magnesia powder with water may be effected by any customary technique, e.g. by repeatedly stirring the washed sintered magnesia powder in water and then separating the water-washed sintered magnesia powder from the resulting mixture, e.g. by filtration. Subsequently, the water adhering to the water-washed sintered magnesia powder is sufficiently removed. The sufficient removal of the adherent water may be performed by customary technique, for example, by filtration such as centrifugal filtration or filtration in vacuo and then drying the resultant sintered magnesia powder, e.g. at 100° to 350° C. It is preferred that the sintered magnesia powder be dried at 100° to 350° C. until the ignition loss of the sintered magnesia powder is minimized, preferably 0.20% by weight or less.

In the alternative mode, the magnesia powder of the present invention may be produced as follows. With respect to the production of an acid-washed sintered magnesia powder, the same procedures as mentioned above are adopted. That is, a magnesia clinker powder is washed with an aqueous solution of an acid. The aqueous solution of an acid used for washing the magnesia clinker powder is preferably an aqueous solution of an acid such as HCl, $H_2SO_4$ or $HNO_3$ which solution has a pH value of 3 or less. The washing of the magnesia clinker powder with the aqueous solution of an acid may be performed by any customary technique, for example, by stirring the magnesia clinker powder in the aqueous solution of an acid for at least one min. The amount of the aqueous solution of an acid used is not critical, and is generally used in an amount of at least one liter per 1000 g of the magnesia clinker powder.

In this alternative mode, the acid-washed sintered magnesia powder is then subjected to heat treatment so that the acid radical content of the sintered magnesia powder is reduced to 0.015% by weight or less, preferably 0.007% by weight or less, most preferably zero percent. In this regard, it is noted that prior to the heat treatment the washed sintered magnesia powder is preferably subjected to dehydration, e.g. by centrifugal filtration or filtration in vacuo. The heat treatment is generally effected at 350° C. or more. It is preferred that the above-mentioned heat treatment be continued until not only the acid radical content of the sintered magnesia powder is reduced to 0.015% by weight or less, preferably 0.007% by weight or less, most preferably zero percent but also the ignition loss of the sintered magnesia powder is minimized, preferably 0.20% by weight or less. The above-mentioned heat treatment may be effected in an oxidizing atmosphere such as an $O_2$ rich combustion gas, neutral atmosphere or reducing atmosphere such as a $CO_2$ rich combustion gas. When the heat treatment is effected in an oxidizing atmosphere at a temperature of 1000° C. or more, the color of the magnesia powder often becomes reddish brown. The reddish brown color becomes deeper when the cooling rate after the heat treatment is slow. Therefore, if the heat treatment is effected in air and the coloration of the powder is to be avoided, the powder should be cooled rapidly after the heat treatment.

In the present invention, it is preferred that the content of an acid radical, e.g. Cl in the thus prepared magnesia powder be as small as possible, i.e. 0.015% by weight or less, more preferably 0.007% by weight or less, most preferably zero percent as determined according to the method as will be mentioned later, and that the ignition loss of the magnesia powder be also as small as possible, i.e. preferably 0.20% by weight or less as determined according to the method that will be described later. That the content of an acid radical such as Cl in the magnesia powder and ignition loss of the magnesia powder are as small as possible, preferably in the respective ranges as mentioned above, is also desired for preventing the metal pipe and heater of the sheathed heater from being corroded by the acid radical such as Cl present in the form of HCl and the water vapor which is one of the components causative of ignition loss.

The magnesia powder thus obtained may be used as an electrical insulating material without being subjected to any further treatment. Alternatively, the surface of the magnesia powder may be coated with $SiO_2$ or $ZrO_2$. The coating of $SiO_2$ or $ZrO_2$ on the surface of the magnesia powder particles is effective for avoiding lowering of the insulation resistance of the magnesia powder which lowering often occurs when the magnesia powder is left under high temperature and high humidity conditions.

As is apparent from the foregoing, the magnesia powder according to the present invention not only has a high insulation resistance at high temperatures but also exhibits an excellent flowability. Therefore, the magnesia powder according to the present invention can be advantageously utilized as an electrical insulating material, particularly as a filling material for electrical insulation of a sheathed heater.

The following Examples illustrate the present invention in more detail but should not be construed as limiting the scope of the invention.

In the following Examples and Comparative Examples, the chemical composition of a magnesia powder was determined as follows. For the determination of MgO, $SiO_2$, CaO, $Fe_2O_3$, $Al_2O_3$ and $B_2O_3$, a magnesia powder was dissolved in an aqueous hot hydrochloric acid solution, and for the determination of $ZrO_2$, a magnesia powder was subjected to alkali fusion using $Na_2CO_3$ and $Na_2B_4O_7 \cdot 10H_2O$ and then dissolved in an aqueous hot nitric acid solution. Then, the resulting solutions were analyzed by means of Inductively Coupled Argon Plasma emission spectrophotometer (type 575-II, produced and sold by Nippon Jarrell-Ash, Japan) to determine the chemical composition of the magnesia powder.

The amount of Cl was determined as follows. A magnesia powder was dissolved in a hot nitric acid, followed by addition of 3 ml of 10% aqueous $AgNO_3$ solution to cause a white precipitate. To the solution containing the precipitate were added a few drops of nitrobenzene and a few drops of a secondary ammonium sulfate solution, and then the amount of Cl was determined by back-titration using a 10% aqueous $NH_4SCN$ solution.

The ignition loss (Igloss) was determined as follows. A magnesia powder was charged in a platinum crucible and then subjected to heat treatment at 1000° C. for one hour. The heat-treated magnesia powder was weighed. The ignition loss was obtained by the following formula.

$$\text{Ignition loss (wt \%)} = \frac{A - B}{A} \times 100$$

wherein A is the weight of the magnesia powder before the heat treatment and B the weight of the magnesia powder after the heat treatment.

The insulation resistance of a magnesia powder was determined as follows. A cylindrical core electrode having an outer diameter of 5 mm and a length of 85 mm was disposed in an electrically conductive pipe (SUS 304) having an inner diameter of 10 mm and a length of 50 mm. Then, a magnesia powder was packed, at a pressure of 1500 kg/cm² (gauge), into a space between the cylindrical core electrode and the electrically conductive pipe (SUS 304) until the length of the packed magnesia powder became 25 mm. Thus, there is obtained a test unit (fettery cell). The electrically conductive pipe and the cylindrical core electrode were connected to an insulation tester through platinum wires. The test unit was placed in an electrical furnace to determine the insulation resistance at predetermined temperatures.

The flowability of the magnesia powder was evaluated in terms of a flow rate as measured in accordance with JIS (Japanese Industrial Standards) Z 2502. In this regard, it is noted that the higher the flow rate the better the flowability.

The particle diameter distribution of the magnesia powder was measured by means of standard sieves prescribed in JIS (Japanese Industrial Standards).

EXAMPLE 1

2.5 kg of a high purity magnesia powder having particle diameters of 0.42 mm or less obtained by sintering magnesium hydroxide at 2000° C. in a rotary kiln was added in 10 l of 0.2N hydrochloric acid. The resulting mixture was stirred for 5 minutes and then allowed to stand. Subsequently, the supernatant was removed by decantation. 10 l of water was added to the above-obtained powder. The resulting mixture was stirred for 5 min, and then subjected to filtration under reduced pressure. Then, 10 l of water was added to the above-obtained powder again. The resulting mixture was stirred for 5 min, subjected to filtration under reduced pressure, and then washed with 5 l of water. The thus obtained powder was dried in an air stream of 120° C. Thus, there was obtained a magnesia powder of the present invention.

A part of the above-obtained magnesia powder was mixed with an epoxy resin, and from the mixture there was prepared a sample plate in which the magnesia powder particles were embedded in the resin. The surface of the sample plate was abraded using a diamond paste until the sections of the powder particles were exposed on the surface of the epoxy resin plate. Then, the contours of the sections of the powder particles exposed on the surface of the sample plate were observed by means of a reflecting microscope (magnification: 50). As a result, it was found that the contours of sections of the powder particles had a circular shape and that 117 particles out of 150 particles which were observed were of single crystals, i.e. 78% of the particles of the magnesia powder were of single crystals.

The above-obtained sintered magnesia powder was subjected to determination of the particle diameter distribution. The results are shown in Table 1.

TABLE 1

| Particle diameter (mm) | Proportion (% by weight) |
|---|---|
| 0.42–0.149 | 2.7 |
| 0.149–0.105 | 5.0 |
| 0.105–0.074 | 12.7 |
| 0.074–0.044 | 56.3 |
| 0.044 or less | 23.3 |

Incidentally, the maximum particle diameter of the powder was 0.42 mm.

Further, the above-obtained magnesia powder was subjected to determination of the chemical composition, Cl content, ignition loss, flow rate and insulation resistance.

The results obtained are shown in Tables 2 and 3.

Further, using the above-obtained magnesia powder, there was prepared a sheathed heater.

The thus prepared sheathed heater was subjected to determination of the insulation resistance. The determination of the insulation resistance was effected as follows. An electric current was applied to the sheathed heater so that the temperature of the outer wall of the sheathed heater was elevated to 600° C. The outer wall of the sheathed heater was maintained at that temperature for 15 min. During the 15-min period the insulation resistance was measured. Then, the electric current was shut off and the sheathed heater was allowed to stand. In the same manner as mentioned above, the insulation resistance was repeatedly determined every 12 hours. The results are summarized in Table 4.

COMPARATIVE EXAMPLE 1

Substantially the same procedure as in Example 1 were repeated to prepare a sintered powder. Then, 2.5 kg of the sintered powder was added in 10 l of 0.2N hydrochloric acid. The resulting mixture was stirred for 5 minutes and then allowed to stand. Subsequently, the supernatant was removed by decantation. 10 l of water was added to the above-obtained powder. The resulting mixture was stirred for 5 min. and then subjected to filtration under reduced pressure. Then, the above-obtained powder was dried in an air stream of 120° C. Thus, there was obtained a magnesia powder.

The above-obtained magnesia powder was subjected to determination of the composition, Cl content, ignition loss, flow rate and insulation resistance. The results obtained with respect to the determination of composition, Cl content and ignition loss and the results obtained with respect to the determination of flow rate and insulation resistance are shown in Tables 2 and 3, respectively.

In substantially the same manner as in Example 1, there was prepared a sheathed heater, except that the above-obtained magnesia powder was employed instead of that employed in Example 1. Then, the thus obtained sheathed heater was subjected to determination of the insulation resistance in the same manner as in Example 1. The results are shown in Table 4.

EXAMPLE 2

In the same manner as in Comparative Example 1, there was prepared a magnesia powder. The thus obtained magnesia powder was subjected to heat treatment at 1200° C. for 30 min. Thus, there was obtained a magnesia powder of the present invention. The above-obtained magnesia powder was subjected to determination of the composition, Cl content, ignition loss, flow rate and insulation resistance. The results obtained with respect to the determination of composition, Cl content and ignition loss and the results obtained with respect to the determination of flow rate and insulation resistance are shown in Tables 2 and 3, respectively.

In substantially the same manner as in Example 1, there was prepared a sheathed heater, except that the above-obtained magnesia powder was employed instead of that employed in Example 1. Then, the thus obtained sheathed heater was subjected to determination of the insulation resistance in the same manner as in Example 1. The results are shown in Table 4.

COMPARATIVE EXAMPLE 2

Substantially the same procedures as in Example 1 were repeated to prepare a sintered powder.

The sintered powder was subjected to determination of the composition, Cl content, ignition loss, flow rate and insulation resistance. The results obtained with respect to the determination of composition, Cl content and ignition loss and the results obtained with respect to the determination of flow rate and insulation resistance are shown in Table 2 and 3, respectively, together with the data obtained in Examples 1 and 2 and Comparative Example 1.

TABLE 2

| | | Example 1 | Comparative Example 1 | Example 2 | Comparative Example 2 |
|---|---|---|---|---|---|
| Composition | MgO | 98.66 | 98.41 | 98.74 | 97.43 |
| | CaO | 0.70 | 0.75 | 0.75 | 1.65 |
| | $SiO_2$ | 0.06 | 0.08 | 0.08 | 0.43 |
| | $Fe_2O_3$ | 0.07 | 0.07 | 0.07 | 0.07 |
| | $Al_2O_3$ | 0.10 | 0.10 | 0.10 | 0.10 |
| | $B_2O_3$ | 0.009 | 0.010 | 0.010 | 0.073 |
| | $ZrO_2$ | 0.24 | 0.24 | 0.24 | 0.24 |
| Cl content (wt %) | | 0.012 | 0.018 | 0 | 0 |
| Ignition loss | | 0.15 | 0.32 | 0.01 | 0.01 |

TABLE 2-continued

|  | Example 1 | Comparative Example 1 | Example 2 | Comparative Example 2 |
|---|---|---|---|---|
| (wt %) | | | | |

TABLE 3

|  |  | Example 1 | Comparative Example 1 | Example 2 | Comparative Example 2 |
|---|---|---|---|---|---|
| Flow rate (sec) | | 41 | 42 | 41 | 42 |
| Insulation resistance ($\Omega \cdot cm$) | 600° C. | $1.4 \times 10^{10}$ | $8.4 \times 10^7$ | $1.5 \times 10^{10}$ | $1.4 \times 10^7$ |
| | 800° C. | $1.5 \times 10^9$ | $1.5 \times 10^7$ | $1.5 \times 10^9$ | $7.9 \times 10^6$ |
| | 1000° C. | $9.1 \times 10^7$ | $5.5 \times 10^6$ | $9.1 \times 10^7$ | $1.1 \times 10^6$ |
| | 1200° C. | $8.1 \times 10^6$ | Not determined | $8.1 \times 10^6$ | Not determined |

In substantially the same manner as in Example 1, there was prepared a sheathed heater, except that the above-obtained sintered powder was employed instead of the magnesia powder employed in Example 1. Then, the thus obtained sheathed heater was subjected to determination of the insulation resistance in the same manner as in Example 1. The results are shown in Table 4 together with the results obtained in Examples and 2 and Comparative Example 1.

TABLE 4

|  | Observations |
|---|---|
| Example 1 | High insulation resistance was maintained during the repeated electric current applications |
| Example 2 | " |
| Comparative Example 1 | The insulation resistance was markedly decreased by the repeated electric current applications |
| Comparative Example 2 | " |

COMPARATIVE EXAMPLE 3

The determination of a flow rate and insulation resistance was effected with respect to a commercially available electrofused magnesia having a particle diameter distribution as shown in Table 5.

TABLE 5

| Particle diameter (mm) | Proportion (% by weight) |
|---|---|
| 0.42–0.149 | 66.4 |
| 0.149–0.105 | 15.6 |
| 0.105–0.074 | 6.9 |
| 0.074–0.044 | 9.5 |
| 0.044 or less | 1.6 |

The results obtained are shown in Table 6.

Incidentally, the powder particles of the commercially available electrofused magnesia were subjected to observation by means of a reflecting microscope in the same manner as in Example 1. As a result, it was found that the contours of the sections of the powder particles had angular convex and concave portions.

EXAMPLE 3

The same procedures as in Example 1 were repeated to obtain a magnesia powder of the present invention. The above-obtained magnesia powder was homogeneously mixed with the same electrofused magnesia powder as used in Comparative Example 3 at a weight ratio of 1:1. The resulting mixture was subjected to determination of the insulation resistance. The results are shown in Table 6.

EXAMPLE 4

The same procedures as in Example 1 were repeated to obtain a magnesia powder of the present invention. The above-obtained magnesia powder was homogeneously mixed with the same electrofused magnesia powder as used in Comparative Example 3 at a weight ratio of 1:4. The resulting mixture was subjected to determination of the insulation resistance. The results are shown in Table 6.

EXAMPLE 5

The same procedures as in Example 1 were repeated to obtain a magnesia powder of the present invention. The above-obtained magnesia powder was homogeneously mixed with the same electrofused magnesia powder as used in Comparative Example 3 at a weight ratio of 1:19. The resulting mixture was subjected to determination of the insulation resistance. The results are shown in Table 6 together with the data obtained in Examples 1, 3, 4 and 5 and Comparative Example 3.

TABLE 6

|  |  | Proportions of the magnesia powder of the present invention and the electrofused magnesia powder | | | | |
|---|---|---|---|---|---|---|
|  |  | Example 1 | Example 3 | Example 4 | Example 5 | Comparative Example 3 |
| Magnesia powder of the present invention (wt %) | | 100 | 50 | 20 | 5 | 0 |
| Electrofused magnesia powder (wt %) | | 0 | 50 | 80 | 95 | 100 |
| Flow rate (sec) | | 41 | 48 | 52 | 56 | 62 |
| Insulation resistance ($\Omega \cdot cm$) | 600° C. | $1.4 \times 10^{10}$ | $7.8 \times 10^9$ | $7.1 \times 10^9$ | $6.8 \times 10^9$ | $7.5 \times 10^9$ |
| | 800° C. | $1.5 \times 10^9$ | $1.2 \times 10^9$ | $9.8 \times 10^8$ | $1.0 \times 10^9$ | $1.1 \times 10^9$ |
| | 1000° C. | $9.1 \times 10^7$ | $9.2 \times 10^7$ | $8.5 \times 10^7$ | $8.5 \times 10^7$ | $8.9 \times 10^7$ |
| | 1200° C. | $8.1 \times 10^6$ | $5.8 \times 10^6$ | $5.2 \times 10^6$ | $3.0 \times 10^6$ | $2.3 \times 10^6$ |

EXAMPLE 6

The same procedures as in Example 2 were repeated to obtain a magnesia powder of the present invention. The above-obtained magnesia powder was homogeneously mixed with the same electrofused magnesia powder as used in Comparative Example 3 at a weight ratio of 1:1. The resulting mixture was subjected to determination of the insulation resistance. The results are shown in Table 7.

EXAMPLE 7

The same procedures as in Example 2 were repeated to obtain a magnesia powder of the present invention. The above-obtained magnesia powder was homogeneously mixed with the same electrofused magnesia powder as used in Comparative Example 3 at a eight ratio of 1:4. The resulting mixture was subjected to determination of the insulation resistance. The results are shown in Table 7.

EXAMPLE 8

The same procedures as in Example 2 were repeated to obtain a magnesia powder of the present invention. The above-obtained magnesia powder was homogeneously mixed with the same electrofused magnesia powder as used in Comparative Example 3 at a weight ratio of 1:19. The resulting mixture was subjected to determination of insulation resistance. The results are shown in Table 7 together with the data obtained in Examples 1, 6 and 7 and Comparative Example 3.

stream of 120° C. Thus, there was obtained a magnesia powder.

The above-obtained magnesia powder was subjected to determination of the composition, Cl content, ignition loss, and insulation resistance at 600° C. The results are shown in Table 8.

EXAMPLE 9

The same procedures as in Example 1 were repeated to prepare a sintered powder. Then, 2.5 kg of the sintered powder was added in 10 l of 0.2N hydrochloric acid followed by stirring for 5 minutes. Subsequently, the supernatant was removed by decantation. 10 l of water was added to the above-obtained powder. The resulting mixture was stirred for 5 min. and then subjected to filtration under reduced pressure. The above-mentioned procedures comprising the addition of 10 l of water to the above-obtained powder and the filtration of the resulting mixture under reduced pressure were repeated 4 times. The thus treated powder was dried in an air stream of 120° C. Thus, there was obtained a magnesia powder of the present invention.

The above-obtained magnesia powder was subjected to determination of composition, Cl content, ignition loss, and insulation resistance at 600° C. The results are shown in Table 8.

EXAMPLE 10

The same procedures as in Example 1 were repeated to prepare a sintered powder., Then, 2.5 kg of the sintered powder was added in 10 l of 0.2N hydrochloric

TABLE 7

| | Proportions of the magnesia powder of the present invention and the electrofused magnesia powder | | | | |
|---|---|---|---|---|---|
| | Example 1 | Example 6 | Example 7 | Example 8 | Comparative Example 3 |
| Magnesia powder of the present invention (wt %) | 100 | 50 | 20 | 5 | 0 |
| Electrofused magnesia powder (wt %) | 0 | 50 | 80 | 95 | 100 |
| Flow rate (sec) | 42 | 49 | 52 | 56 | 62 |
| Insulation resistance ($\Omega \cdot cm$) 600° C. | $1.5 \times 10^{10}$ | $1.2 \times 10^{10}$ | $9.8 \times 10^9$ | $7.8 \times 10^9$ | $7.5 \times 10^9$ |
| 800° C. | $1.5 \times 10^9$ | $1.2 \times 10^9$ | $1.2 \times 10^9$ | $1.0 \times 10^9$ | $1.1 \times 10^9$ |
| 1000° C. | $9.1 \times 10^7$ | $8.4 \times 10^7$ | $7.5 \times 10^7$ | $7.0 \times 10^7$ | $8.9 \times 10^7$ |
| 1200° C. | $8.1 \times 10^6$ | $5.5 \times 10^6$ | $3.2 \times 10^6$ | $2.8 \times 10^6$ | $2.3 \times 10^6$ |

COMPARATIVE EXAMPLE 4

The same procedures as in Example 1 were repeated to prepare a sintered powder. Then 2.5 kg of the sintered powder was added in 10 l of 0.2N hydrochloric acid. The resulting mixture was stirred for 5 minutes. Subsequently, the supernatant was removed by decantation. 10 l of water was added to the above-obtained powder. The resulting mixture was stirred for 5 min. and then subjected to filtration under reduced pressure. Then, the above-obtained powder was dried in an air acid, followed by stirring for 5 minutes. Subsequently, the supernatant was removed by decantation. 20 l of water was added to the above-obtained powder. The resulting mixture was stirred for 5 min. and then subjected to filtration under reduced pressure. The thus treated powder was dried in an air stream at 120° C. Thus, there was obtained a magnesia powder of the present invention.

The above-obtained magnesia powder was subjected to determination of composition, Cl content, ignition loss, and insulation resistance at 600° C. The results are shown in Table 8.

TABLE 8

| | | Example 9 | Example 1 | Example 10 | Comparative Example 4 |
|---|---|---|---|---|---|
| Composition (wt %) | MgO | 98.73 | 98.66 | 98.56 | 98.42 |
| | CaO | 0.70 | 0.70 | 0.72 | 0.75 |
| | $SiO_2$ | 0.06 | 0.06 | 0.06 | 0.07 |
| | $Fe_2O_3$ | 0.07 | 0.07 | 0.07 | 0.07 |

TABLE 8-continued

|  | Example 9 | Example 1 | Example 10 | Comparative Example 4 |
|---|---|---|---|---|
| $Al_2O_3$ | 0.10 | 0.10 | 0.10 | 0.10 |
| $B_2O_3$ | 0.009 | 0.009 | 0.010 | 0.012 |
| $ZrO_2$ | 0.24 | 0.24 | 0.24 | 0.24 |
| Cl (wt %) | 0.007 | 0.012 | 0.015 | 0.018 |
| Ignition loss (wt %) | 0.08 | 0.15 | 0.23 | 0.32 |
| Insulation resistance ($\Omega \cdot cm$) | $1.6 \times 10^{10}$ | $1.4 \times 10^{10}$ | $1.2 \times 10^9$ | $5.7 \times 10^8$ |

What is claimed is:

1. A method for producing a magnesia powder for use as an electrical insulating material, said method comprising the steps of:
   (a) providing a magnesia clinker powder;
   (b) washing said powder with an aqueous solution of an acid; and either
   (c) subjecting said acid-washed magnesia powder to heat treatment until the acid radical content of the magnesia powder is reduced to 0.015% by weight or less, or
   (d) washing said acid-washed magnesia powder with water until the acid radical content of the magnesia powder is reduced to 0.015% by weight or less, and drying the magnesia powder.

2. The method of claim 1, wherein said heat treatment in step (c) is performed at a temperature of at least 350° C.

3. The method of claim 1, wherein the drying in step (d) is performed at a temperature in the range from about 100° C. to about 350° C.

4. The method of claim 1, wherein the acid radical content of said powder is reduced to approximately 0.007% by weight.

5. The method of claim 1, wherein the acid radical content of said powder is reduced to substantially zero % by weight.

* * * * *